United States Patent [19]

Kajimoto et al.

[11] 4,004,785
[45] Jan. 25, 1977

[54] SELF-CLEANING TYPE STIRRING APPARATUS

[75] Inventors: Hikokusu Kajimoto; Takafumi Shimada, both of Hiroshima, Japan

[73] Assignee: Mitsubishi Jukogyo Kabushiki Kaisha, Tokyo, Japan

[22] Filed: Jan. 11, 1973

[21] Appl. No.: 322,685

[30] Foreign Application Priority Data

Jan. 19, 1972    Japan .................................. 47-7385

[52] U.S. Cl. .................................. 259/104; 259/6; 259/DIG. 18
[51] Int. Cl.² ...................... B01F 7/18; B01F 15/06
[58] Field of Search ............ 259/6, 21, 41, 64, 104, 259/119, DIG. 18

[56] References Cited

UNITED STATES PATENTS

| | | |
|---|---|---|
| 2,170,303 | 8/1939 | Helstrup .................... 259/DIG. 18 |
| 3,155,056 | 11/1964 | Smith ............................ 259/104 X |
| 3,640,509 | 2/1972 | Inamura .......................... 259/6 X |
| 3,650,511 | 3/1972 | Henschel .......................... 259/104 |
| 3,717,330 | 2/1973 | Pinney ............................ 259/6 |

FOREIGN PATENTS OR APPLICATIONS

| | | |
|---|---|---|
| 1,169,993 | 9/1958 | France .............................. 259/104 |
| 993,226 | 7/1951 | France .............................. 259/104 |
| 6,659 | 8/1956 | Germany .......................... 259/41 |

*Primary Examiner*—Leonard D. Christian
*Assistant Examiner*—Alan Cantor
*Attorney, Agent, or Firm*—Cushman, Darby & Cushman

[57] ABSTRACT

A self-cleaning type stirring apparatus comprising a cylindrical container, a plurality of rotary shafts rotatably extending into said cylindrical container and not having a common axis of rotation, and the same number of stirring members as the number of said rotary shafts disposed in said cylindrical container at locations radially remote from the axes of rotation of said rotary shafts respectively and being slightly spaced from or in light contact with each other, the radially outermost one of said stirring members being slightly spaced from or in light contact with the inner wall of said cylindrical container, each of said stirring members being fixedly connected with each of said rotary shafts in such a manner that it will rotate around its own axis while rotating bodily incident to the rotation of the two rotary shafts to which it is connected, and said stirring members during rotation not interfering with each other.

2 Claims, 9 Drawing Figures

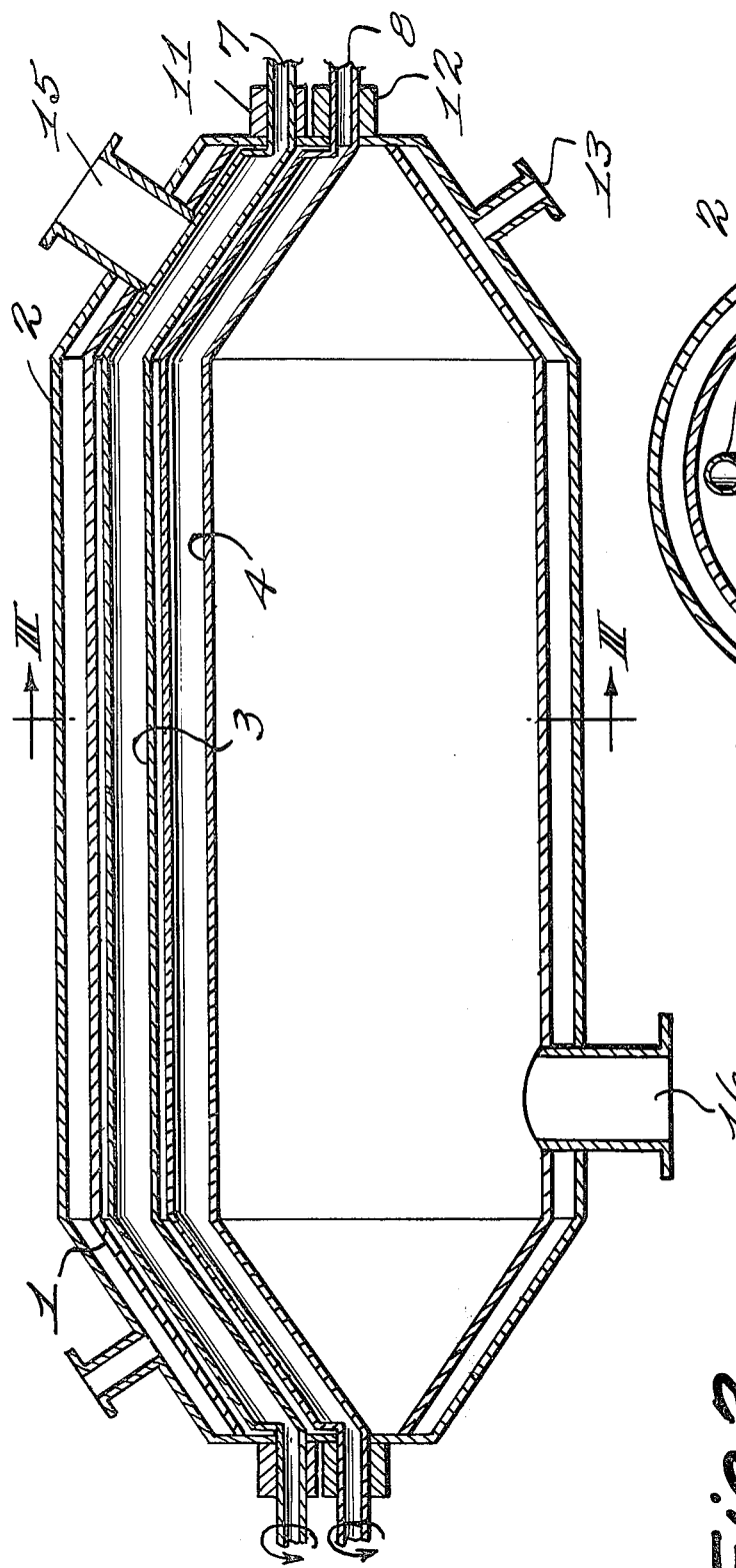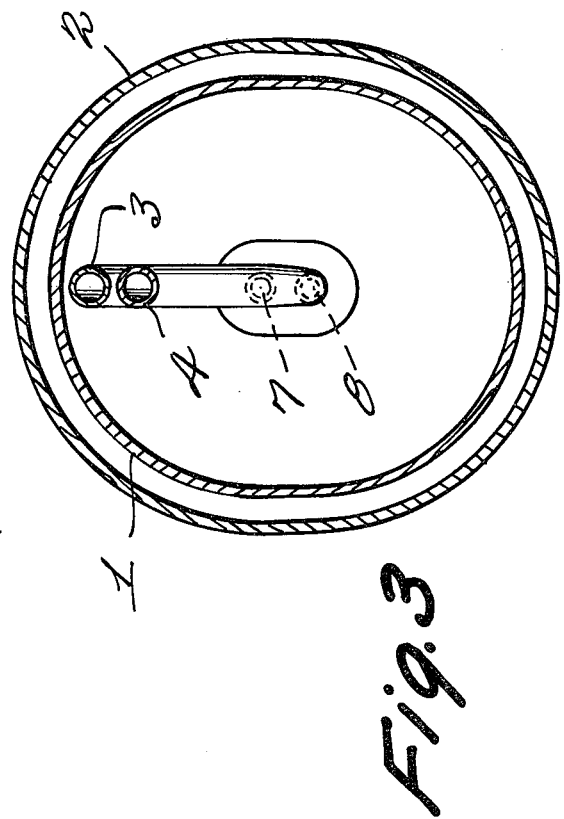
Fig. 2
Fig. 3

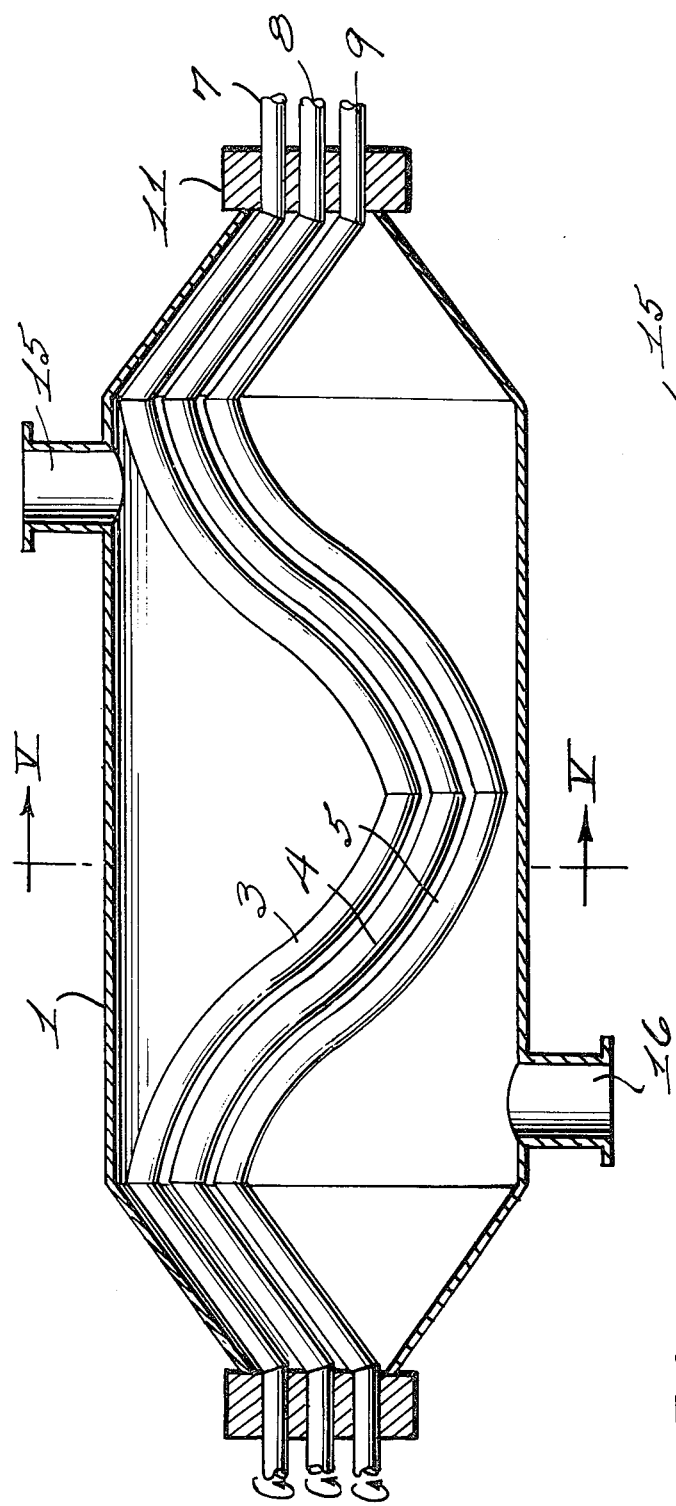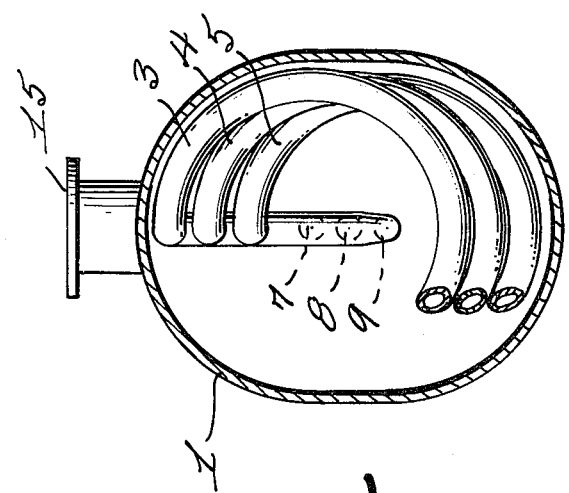
Fig. 4
Fig. 5

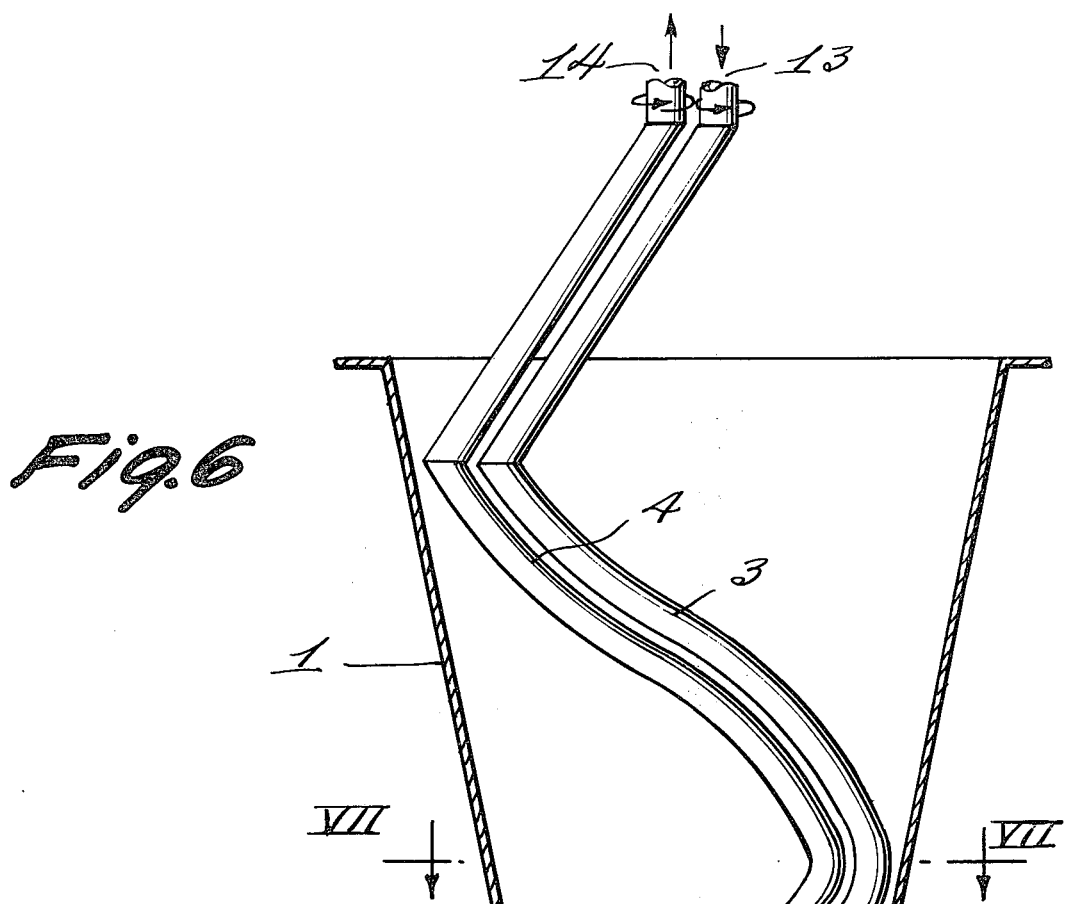
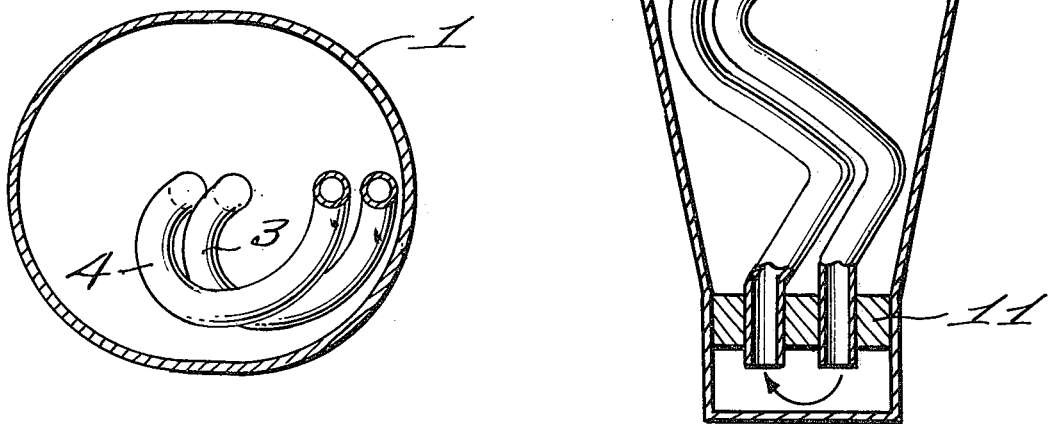

SELF-CLEANING TYPE STIRRING APPARATUS

BACKGROUND OF THE INVENTION

1. Field of the Invention

This invention relates to stirring apparatus for fluids, slurries and powders, such as a polymerization reaction apparatus for preparing polymers from polymerizable organic compounds such, for example, as vinyl- and conjugated diene-series hydrocarbons. More specifically, the invention relates to a novel stirring apparatus so designed that the rate of heat exchange with materials being processed can be increased and the attachment of polymers, gels, crystalline solids and other solids to stirring members and to the inner wall of a container can be prevented. Rate of heat exchange and attachment have frequently posed problems in the operation of stirring apparatus.

2. Description of the Prior Art

In the operation of a stirring apparatus, a so-called close-clearance method or heating surface scraping method has generally being employed for the purpose of increasing the rate of heat exchange between a heating surface, such as the apparatus wall, and a material being treated, in which a stirring member is operated in very close proximity to the heating surface whereby the material being treated and located adjacent the heating suface is scraped by the stirring member. This type of apparatus has a remarkable effect in increasing the heat exchanging rate as is well known, and also makes a great contribution to the prevention of attachment of the material being treated to the apparatus wall. However, in conventional appararatus of this type, while the purposes of increasing the rate of heat exchange with the apparatus wall and preventing the attachment of material to the apparatus wall are attained, such effects cannot substantially be expected between the stirring member and the material being treated. On the other hand, with reference to the stirring member, a so-called self-cleaning type stirrer has been materialized especially from the attachment prevention point of view, which is composed of a plurality of stirring members, so that the material attached to the surface of one stirring member may be removed therefrom by the other stirring member. However, such a stirrer is restricted to special shapes and only a very few stirrers of this type are being put in practical use. Further, in considering generally the prevention of material attachment, the attachment of material not only to the stirrer but also to the apparatus wall should be prevented concurrently. The conventional apparatus of the type described have had the disadvantage that the effective volume of the apparatus actually occupied by a material is very small due to the limitation imposed on the structure of the stirrer. Little of the conventional apparatus has been satisfactory in respect of the requirement that both the apparatus wall and stirrer are self-cleaned completely concurrently and that the effective volume of the apparatus occupied by a material is large. Stirring is required to attain many purposes, i.e., not only the purpose of increasing the heat transfer rate and preventing the attachment of material, referred to hereinbefore, but also the purpose of making more uniform the concentration and temperature of a material being treated, increasing the moving speed of the material, securing a sufficient retention time of the material and obtaining a uniform distribution of the material; but none of the conventional apparatus has been satisfactory in concurrently attaining all of these purposes.

SUMMARY OF THE INVENTION

It is, therefore, the object of the present invention to provide a novel stirring apparatus which has simultaneously the function of complete self-cleaning and the function of achieving the primary purposes of stirring, and which is substantially free of structural restriction in the selection of effective volume ratio.

The object of the invention can be achieved by an apparatus of the construction which will be described hereunder: Namely, a plurality of rotary shafts not having a common axis of rotation and the same number of stirring members as the number of said rotary shafts located remote from the axes of rotation of said rotary shafts respectively and slightly spaced from or slightly contacting each other are disposed in a cylindrical container. These stirring members are preferably arranged such that, during rotation, the outer edges of the radially outermost one of the stirring members are just closely spaced from or slightly contact the inner wall of the cylindrical container at points closest to said inner wall. Each of the stirring members is fixedly connected to each of the rotary shafts in such a manner that is rotates bodily with the two rotary shafts to which it is connected. For the sake of complete self-cleaning, it is preferably to arrange the stirring members and rotary shafts such that straight lines respectively connecting the centers of rotation of the stirring members round their own axes with the centers of bodily rotation of the same round the axes of rotation of the associated rotary shafts and lying in a plane perpendicular to the rotary shafts become parallel to each other. Further, an arrangement should be made such that, when the respective rotary shafts rotate in the same direction and at the same rate of angular displacement, the rotation of the respective stirring members will not be interfered by each other. (Such arrangement will be described in detail in the embodiment to be described later.) The stirring apparatus constructed as described above is novel and satisfies the intended purposes. Now, the present invention will be described in detail by way of example hereunder with reference to the accompanying drawings.

BRIEF DESCRIPTION OF THE DRAWINGS

FIG. 2 is a vertical sectional view through the axis of an embodiment of the apparatus of this invention;

FIG. 3 is a vertical sectional view of the apparatus taken on the line III—III of FIG. 2;

FIGS. 4, 6 and 8 are vertical sectional views through the axis of other embodiments of the invention respectively; and FIGS. 5, 7 and 9 are vertical sectional views taken on the lines V-V, VII—VIII and IX—IX of FIGS. 4, 6 and 8 respectively.

DESCRIPTION OF THE PREFERRED EMBODIMENT

Figure 1:
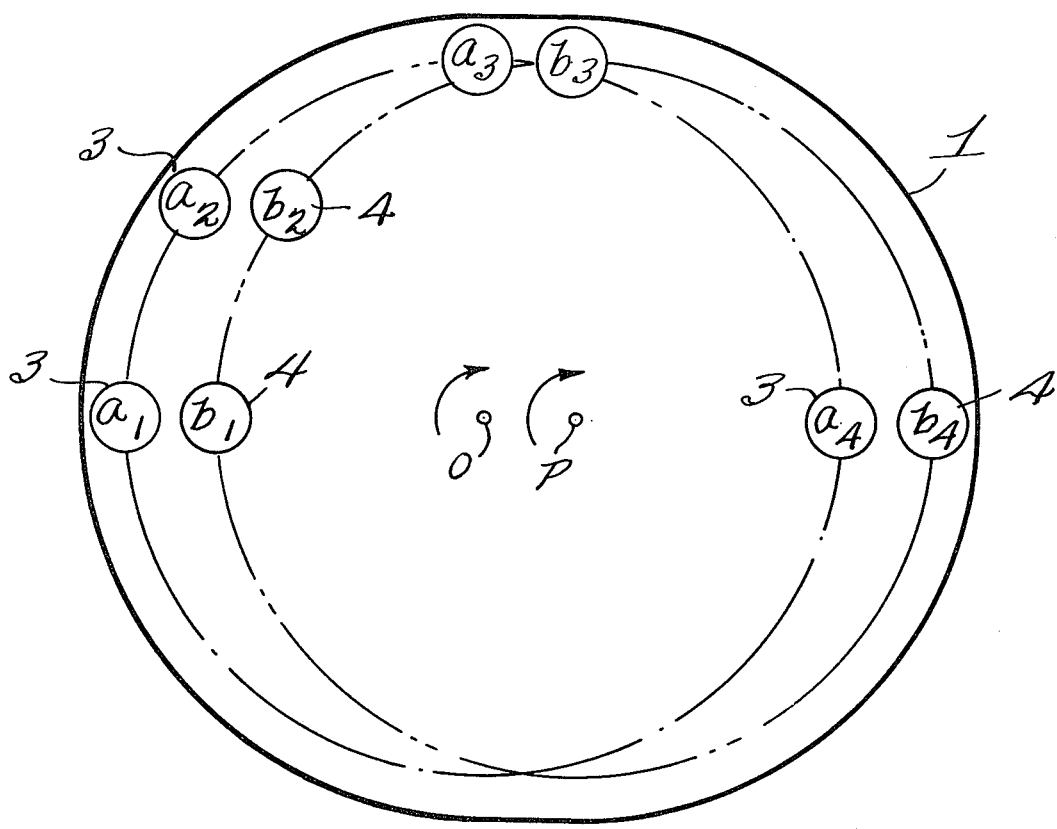
FIG. 1 is a diagram for explaining the principle of the apparatus according to the present invention.

FIG. 2 shows the longitudinal vertical sectional view of an embodiment of the invention and FIG. 3 a transverse vertical sectional view of the same taken on the line III—III of FIG. 2. The stirring apparatus of the invention includes a jacket 2 having heating medium inlet and outlet ports 13, 14 and a cylindrical container 1 having inlet and outlet port 15, 16 for a material to be treated. Rotary shafts 7, 8 are rotatably supported at the opposite ends of the cylindrical container 1 by bearings 11, 12 respectively. Thus, the stirring apparatus of the invention will be described and illustrated herein as having two rotary shafts for stirring. In the cylindrical container 1 are disposed tubular stirring members 3, 4 arranged in such a manner that they are closely spaced from or in light contact with the inner wall of the container 1, respectively. These stirring members 3, 4 are connected independently with the rotary shafts 7, 8 such that the stirring member 3 are rotary shaft 7 and the stirring member 4 and rotary shaft 8 rotate respectively in the same direction at the same rate of angular displacement. As seen, the stirring members 3, 4 are arranged remote from the axes of rotation of the rotary shafts 7, 8 respectively. The rotary shafts 7, 8 are connected to driving means so as to be driven in the same direction at the same rate of rotation. The opposite ends of the stirring members 3, 4 are respectively inclined at a predetermined angle to the axis of the cylindrical container 1. The arrangement is such that the stirring members when driven by the respective rotary shafts will not interfere with each other. It will be obvious that the angle of inclination of the stirring members are subjected to limitation. In the embodiment shown, the cylindrical container 1 has a cross-sectional shape substantially close to the outer profile of the combined loci of rotational movements of the stirring members 3, 4. Now, the operation and effect of the subject apparatus constructed as described above will be explained with reference to FIG. 1. FIG. 1 is a simplified diagram of the apparatus shown in FIG. 8 of the invention, for explaining the operation of the apparatus. The stirring members 3, 4 respectively bodily rotate once around the axes of rotation O, P of the rotary shafts 7, 8 in the same direction and at the same rate of angular displacement as said rotary shafts, along the orbits indicated by the chain lines. FIG. 1 shows the positional relation of the axes $a_1$, $b_1$ of the stirring members 3, 4, which axes make angular displacement, incident to the rotation of the rotary shafts, to $a_2$, $b_2$; $a_3$, $b_3$ and $a_4$, $b_4$. In the embodiment shown, straight lines respectively connecting the axes of rotation of the stirring members the axes of rotation of the associated rotary shafts, and lying in the sheet of the drawing are parallel to each other. It will be readily understood that, with such movements of the stirring members as described above, the material being treated, present in the proximity of the entire surfaces of the stirring members is completely cleared from said surfaces on every rotation of said stirring members, or the so-called self-cleaning effect can completely be achieved. Further, the bodily rotational movement of the stirring members 3, 4 over the entire area inside the cylindrical container 1 brings about a remarkable effect in making more uniform macroscopically the temperature and concentration of the material being treated, while the rotational movement of the same around the respective shaft axes, contributes to the microscopic uniformity of said temperature and concentration. Thus, stirring by the stirring members has a quite ingenious temperature and concentration equalizing effect. It will be obviously understood that, in a close-clearance or scraping type of apparatus, such as that of the present invention, the rate of heat exchange can be increased and the attachment of material can be prevented highly effectively. It will also be understood that, in the stirring apparatus of the invention which is of a complete self-cleaning type, not only can the rate of heat exchange be increased between the material and the apparatus wall, but the stirring members can also be utilized highly effectively for the heat exchange between the material being treated, and themselves when a hollow structure is employed for said stirring members and the surfaces thereof are used as heating surfaces by passing a heating medium in said hollow stirring members through rotary joints.

Other embodiments based upon the principle of the invention will be described hereunder: The stirring apparatus shown in FIGS. 4 and 5 has a different form of stirring members disposed, therein. Namely, the stirring members each have a spiral structure for encouraging the radical circulatory movement and axial movement of the material being treated. In this embodiment, three stirring members are disposed in the cylindrical container, which, as seen in the sectional view of FIG. 5 taken on the line V-V of FIG. 4, constitute a sort of spiral belt consisting of a tube bank. It will be understood that such stirring apparatus has a remarkable stirring effect.

FIGS. 6 and 7 show still another embodiment of the invention, in which the configuration of the container is determined according to the structure of the stirring members or conversely, the structure of the stirring members is determined according to the configuration of the container. A container having a conical shape is frequently used where a strong stirring and mixing effect is desired in the stirring of highly viscous fluid or powders, and this embodiment exemplifies stirring members adapted for use in such container.

Figure 8:
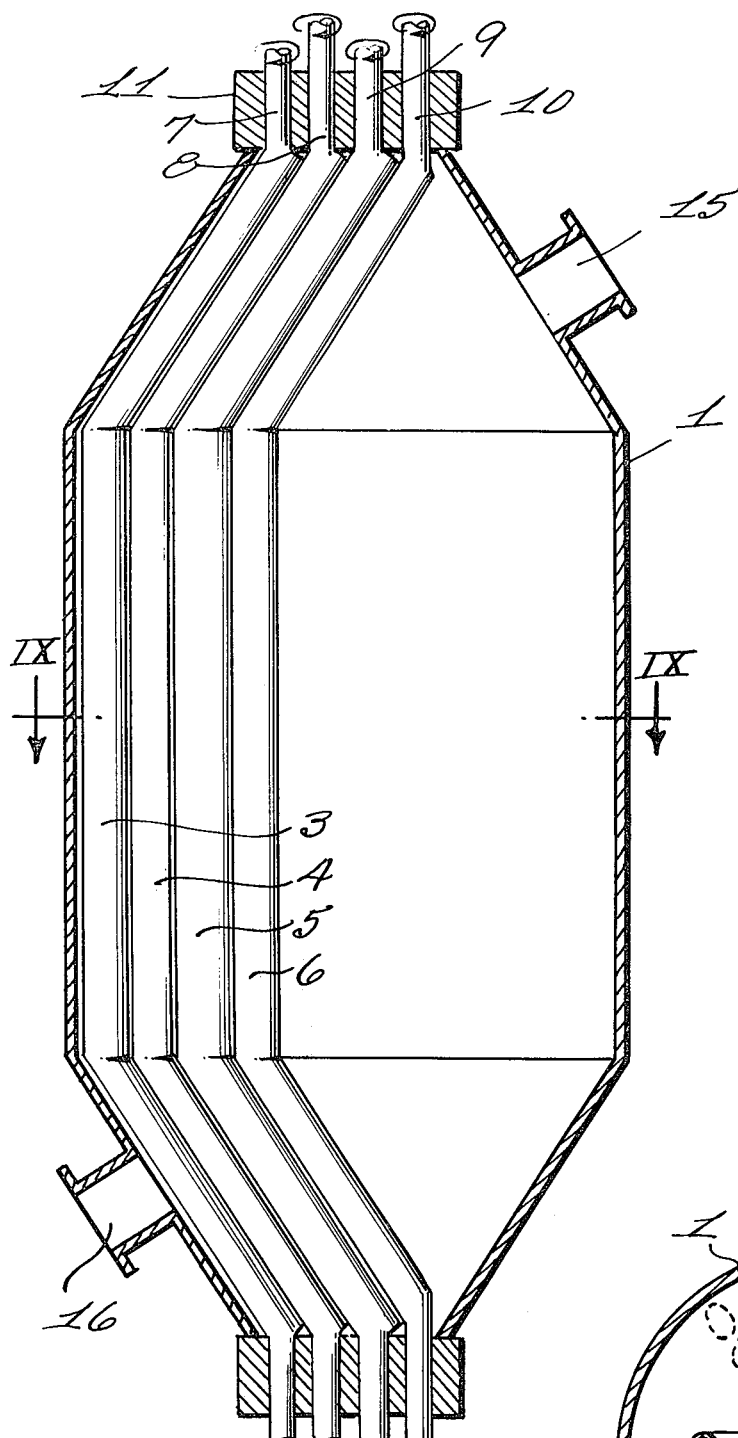
Figure 9:
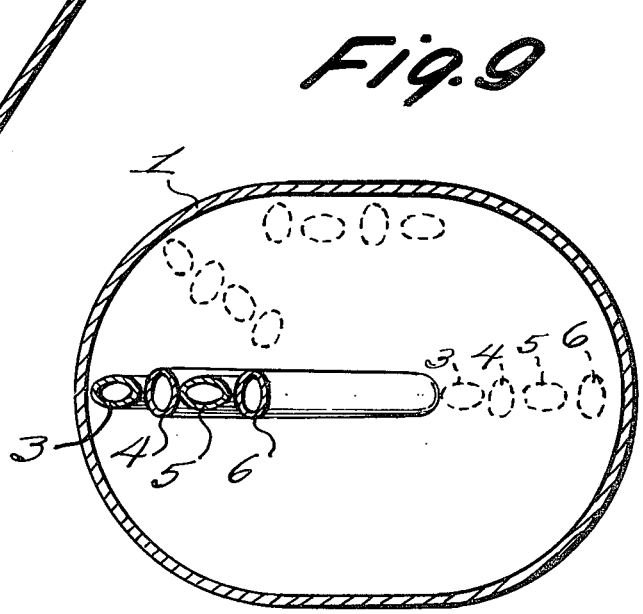

FIGS. 8 and 9 show still another embodiment of the invention. It will be understood from this embodiment that the structure of the stirring members is not restricted only to the circular sectional shape shown in the embodiment of FIGS. 2 and 3, and that the apparatus of the invention can have more than two rotary shafts. Namely, this embodiment shows that the self-cleaning effect can be obtained in the fashion of contact called an elliptical contact, by using stirring members having elliptical cross sections and also shows that the apparatus comprising more than two rotary shafts is essentially the same in construction as the apparatus comprising two rotary shafts.

In the foregoing discussion, with reference to the drawings, the self-cleaning type stirring apparatus is seen to include a container having a tubular outer periphral wall and two opposite ends. The apparatus is seen to further include a corresponding plurality of rotary shafts rotatably extending into the container from the two opposite ends to provide pairs of rotary shafts, the rotary shafts at each end all having axes of rotation mutually laterally displaced from one another;

a plurality of stirring members disposed within the container, the number of stirring members corresponding to the number of said pairs of rotary shafts;

each stirring member being connected between the two individuals of a respective pair of said rotary shafts and each stirring member including a portion which is substantially radially displaced from the axes of rotation of the rotary shafts of the respective pair to which that stirring member is connected, so that as each pair of rotary shafts is rotated once, said portion of the respective stirring member is correspondingly once revolved about the rotary axes of that pair of rotary shafts;

said stirring members and rotary shafts, collectively, upon rotation of said rotary shafts, sweeping close to said two peripheral walls and said opposite ends, and sweeping close to one another along substantially the full axial extent of the interior of the container, without mutual interference.

The rotary shafts are preferably tubular, in coaxial relation with one another and with said axes of rotation thereof; said stirring members are tubular and each extends arcuately between the rotary shafts to which it is conncted, so that a continuous heat transfer fluid passageway is formed through each pair of rotary shafts and the stirring member connected therebetween; said peripheral wall is of the following cross sectional shape: generally flattened oval form having two semi-circular portions laterally separated by parallel diameters so as to be concave toward one another, and two substantially straight line portions tangentially joining respective ends of the two semi-circular portions; and the axes of the rotary shafts of each end of the container are spaced from one another along a straight line which parallels said straight line portions.

In each instance depicted, when the stirring members all extend in the same radial direction from the rotary shafts, they interfittingly nest along substantially their full lengths within the container, with the radially outermost one lying adjacent the peripheral wall of the container.

The apparatus of the invention, as has been described in detail hereinbefore, has simultaneously the remarkable effect in preventing the attachment of a material being treated, owing to the substantially perfect self-cleaning function of the apparatus wall and stirring members, in increasing substantially the heat transfer rate owing to the effect of close clearance or surface scraping action, and further in making more uniform the temperature and concentration of the material being treated. Further, the apparatus of the invention, as may be readily understood, has the advantages that it is simple in construction and that the volume efficiency can be selected substantially freely. These advantages of the invention makes the apparatus particularly suitable for use as a polymerization reaction apparatus. The apparatus of the invention can be suitably used, for example, as a reaction apparatus for the production of polyvinyl chloride by the suspension and bulk polymerization processes in which heavy attachment of formed polymer and generation of a large amount of reaction heat tend to occur, a reaction apparatus for preparing polypropyrene by the solvent slurry polymerization process, a reaction apparatus for preparing diene-series hydrocarbon polymers by the solution polymerization process in which formation and attachment of saponified compounds tend to occur, and a reaction apparatus for preparing copolymers such as polystyrene, rubber-modified polystyrene, acrylonitrile-styrene and acrylonitrile-butadiene-styrene, by the bulk polymerization process.

What is claimed is:

1. A self-cleaning type stirring apparatus, comprising:
   a container having a tubular outer peripheral wall and two opposite ends;
   a corresponding plurality of rotary shafts rotatably extending into the container from the two opposite ends to provide pairs of rotary shafts, the rotary shafts at each end all having axes of rotation mutually laterally displaced from another;
   a plurality of stirring members disposed within the container, the number of stirring members corresponding to the number of said pairs of rotary shafts;
   each stirring member being of looping U-shape so as to include a central portion and two opposite end portions which are inclined with respect to the axes of rotation of said rotary shafts;
   the opposite end portions of each stirring member being connected between the two individuals of a respective pair of said rotary shafts so that each stirring member includes a central portion which is substantially radially displaced from the axes of rotation of the rotary shafts of the respective pair to which that stirring member is connected, so that as each pair of rotary shafts is rotated once, said central portion of the respective stirring member is correspondingly revolved about the rotary axes of that pair of rotary shafts;
   said stirring members including the central and two opposite end portions thereof and said rotary shafts, collectively, upon rotation of said rotary shafts, sweeping close to said peripheral wall and said two opposite ends, and sweeping close to one another along substantially the full axial extent of the interior of the container, without mutual interference, the stirring members all nesting when all extend in the same radial direction from the respective rotary shafts.

2. The apparatus of claim 1 wherein the rotary shafts of each pair are tubular, in coaxial relation with one another and with said axes of rotation thereof; said stirring members are tubular and each extends between the rotary shafts to which it is connected, so that a continuous heat transfer fluid passageway is formed through each pair of rotary shafts and the stirring member connected therebetween; said peripheral wall is of the following cross sectional shape: generally flattened oval form having two semi-circular portions laterally separated by parallel diameters so as to be concave toward one another, and two substantially straight line portions tangentially joining respective ends of the two semicircular portions; and the axes of the rotary shafts of each end of the container are spaced from one another along a straight line which parallels said straight line portions.

* * * * *